Dec. 18, 1951                F. KOCH               2,579,081
TAPPING UNIT HAVING RAPID TRAVERSE
AND CONTROLLED RATE OF FEED
Filed Nov. 13, 1950
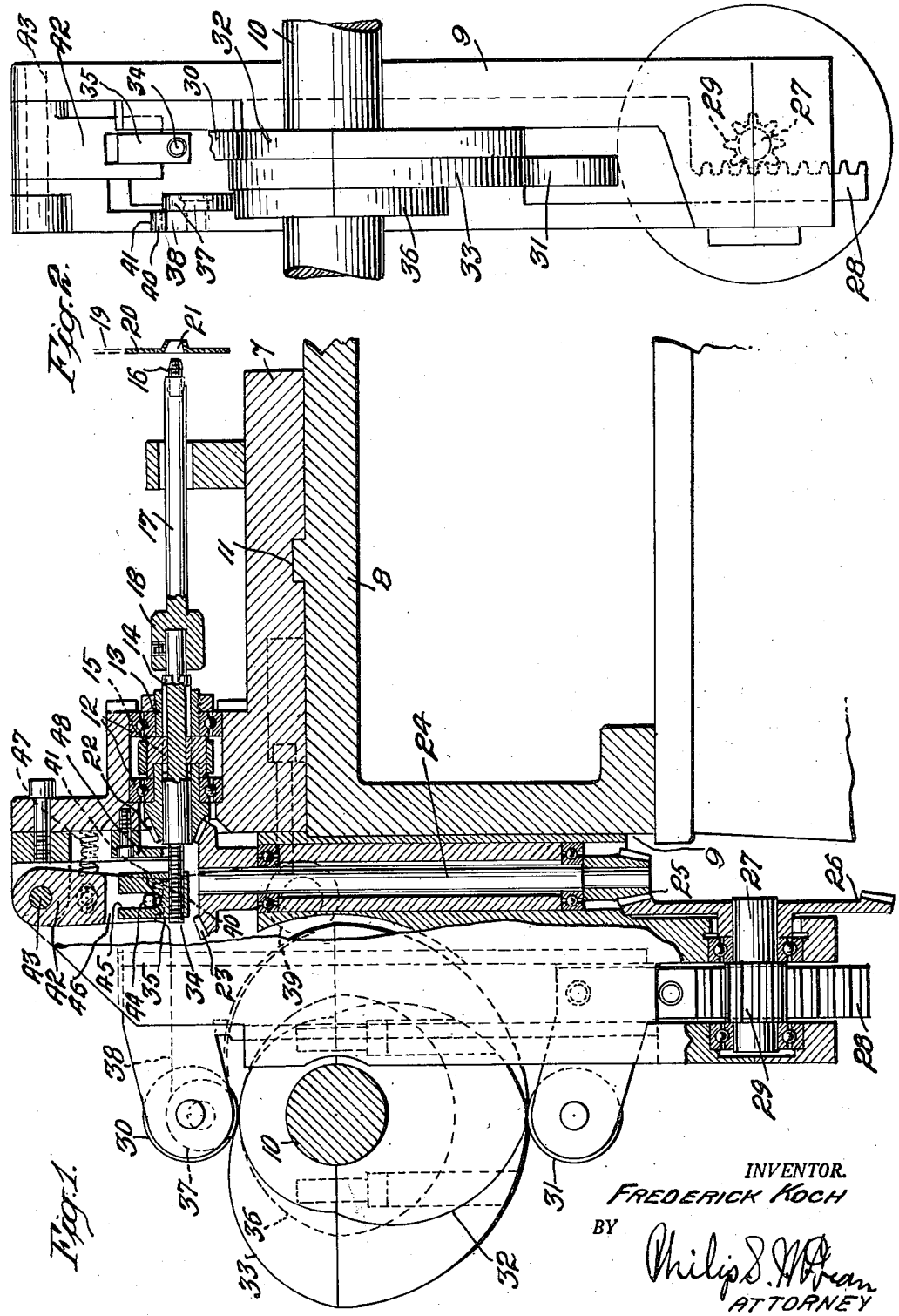
INVENTOR.
FREDERICK KOCH
BY
*Philip S. Hoffman*
ATTORNEY Patented Dec. 18, 1951

2,579,081

UNITED STATES PATENT OFFICE 2,579,081

TAPPING UNIT HAVING RAPID TRAVERSE AND CONTROLLED RATE OF FEED

Frederick Koch, Sparta, N. J., assignor to C. Todd, Rutherford, N. J., as trustee Application November 13, 1950, Serial No. 195,364

5 Claims. (Cl. 10—139)

The invention herein disclosed is a screw threading attachment for use on what are known as "multi-slide" machines, in which various tool carrying slides mounted on a bed are actuated in synchronized relation from cam shafts located at the sides and ends of the bed.

Special objects of the invention are to provide a simple and practical form of tapper readily applicable to machines of this type and adapted to be actuated by cams provided for the purpose and disposed on one of the cam shafts of the machine.

Particularly it is a purpose of the invention to effect the tapping operation and additionally to impart bodily travel to the tap necessary to reach offset portions of the stock and to retract the tap to fully clear the stock for subsequent advancing or feeding movements of the same.

Further special objects of the invention are to attain these various objects in a small size form of construction which will not take up much room on the machine and which can be applied to the machine without interfering with other operations performed by the machine.

Other desirable objects and the novel features through which all purposes of the invention are attained are set forth or will appear in the course of the following specification.

The drawing accompanying and forming part of the specification illustrates a present practical embodiment of the invention. Structure, however, may be modified and changed as regards the immediate illustration, all within the true intent and scope of the invention as hereinafter defined and claimed.

Fig. 1 in the drawing is a broken sectional view across the bed of a "multi-slide" machine, showing the invention applied thereto;

Fig. 2 is an end or outside face view of the tapping unit and the three cams for actuating the same, with the cam shaft shown broken away and in section.

In a preferred form of the invention as here illustrated, a tapper is made up in a unitary form which can be mounted on the bed of a "multi-slide" and actuated by cams on one of the cam shafts of that machine.

Copending patent application Serial No. 180,131, filed August 18, 1950, is referred to as showing an up-to-date model of a "multi-slide" with a center line feed and with cam shafts at equal distances at opposite sides of the bed, enabling the slides and various other tools used in the machine to be located interchangeably at different sides or ends of the machine.

The present tapping embodiment of the tapping unit is designed for such use and is therefore shown in Fig. 1 as having an angular base structure made up of an upper horizontal portion 7 to extend over the bed 8 of the machine and a dependent upright portion 9 to hug the side of the bed at the inside of the cam shaft 10 at that side or end of the bed.

This angular base may be provided with keyways 11 and be otherwise shaped to be interlockingly held on the bed and to be removably secured in position as by means of bolts or other fastenings.

The horizontal portion of the base carries bearings 12 for a tubular shaft 13 in which the tap spindle 14 is slidingly keyed at 15.

This spindle either directly or indirectly carries the tap 16. In the illustration the tap is shown carried by a short shaft 17 forming a prolongation of the spindle 14 and connected therewith by means of a coupling 18, clutch, universal joint or other form of connection.

The center stock line is indicated at 19 and a section of strip stock is shown in feed position at 20, perforated and bushed at 21, ready for the screw threading operation.

The horizontal drive sleeve 14 is shown as having a bevel pinion 22 at the other end in mesh with a bevel gear 23 on the upper end of a vertical shaft 24 journaled in the upright portion 9 of the angular base at the side of the bed and carrying a bevel pinion 25 at the lower end in mesh with a bevel gear 26 on the inner end of a horizontal stub shaft 27 journaled in the lower end of the upright portion of the base.

Shaft 27 is alternately rotated in opposite directions by means of vertical rack 28 slidingly guided in the upright portion of the base in engagement with a pinion 29 on the shaft and carrying upper and lower cam rolls 30 and 31, riding the upper and lower edges, respectively, of cams 32, 33, secured in side-by-side relation on the cam shaft 10.

Fig. 2 shows how the upper and lower cam rolls 30, 31, are offset laterally to respectively engage the side-by-side cams 32, 33.

These may be split cams removably bolted on the cam shaft in proper position to raise and lower the rack 28.

The vertical, reciprocatory movements of the rack will, through the gears 26, 25, and 23, 22, rotate the tap spindle first in one direction and then in the opposite direction to effect the necessary threading of the stock and unscrewing of the tap from the threaded stock.

The tap spindle is given a definite lead in the machine illustrated by the provision of the outer end of the spindle 14 with a lead screw extension 34 turning in a correspondingly threaded nut block 35.

This nut block is held stationary or substantially so during the threading and unscrewing operations of the tap and is bodily shifted in the present disclosure before and after such operations to impart more or less rapid feeding-in and retracting movements to the tap, all under control of a special feed cam 36 mounted on the cam shaft at the side of the rack lowering cam 33.

The special feed cam 36 is shown as engaged by a roller 37 on the outer arm of a substantially triangular bell crank lever 38 pivotally supported at its lower, inner corner at 39 and carrying at its upper, inner corner the teeth of a gear segment 40 in mesh with companion teeth 41 on the lower end of a lever 42 pivotally supported at its upper end at 43. The latter is shown as carrying at its lower end a transverse pin 44 engaged in a slot 45 in the nut block 35, said nut block received in a slot 46 in the lower end of the lever.

A spring 47 is shown thrusting the lever 42 outwardly and through the engaging gear segments 40, 41, holding the lever 38 rocked outwardly with the roller 37 thereon in engagement with the control cam 36.

The cam 36 is designed to impart the desired quick feed and retractive movements to the tap spindle prior to and after the screw threading and unscrewing movements of the tap, and this independently of rotation of the tap spindle in opposite directions effected by the rack 28 and the two cams 32 and 33 for actuating the same.

By the combination of means described the tap spindle can be given any desired length of longitudinal movement to engage offset or deep seated screw openings in the stock and to quickly clear these offset parts to permit subsequent advancing movements of the stock.

The entire mechanism, except for the cams, can be organized as a single, compact unit taking up but small space and therefore adapted to be mounted in practically any desired or necessary relation on the machine.

The cams required to effect the rotary and longitudinal movements of the tap spindle may be made up separately as shown, in the form of three easily applied split cams, or they may be combined in one or more cam units, as found most practical.

The construction as a whole consists of relatively few, simple parts which can be produced at reasonable cost.

A stop or stops may be provided for limiting the in and out feed strokes of the tap spindle. An example of such a stop is illustrated at 48 in Fig. 1, positioned to limit the inner throw of the nut block 35 carried by the lower end of lever 42.

What is claimed is:

1. A tapping unit for a machine having a substantially horizontal bed and a cam shaft at the side of the bed and comprising an angular base having a horizontal top portion to seat on the bed and a dependent upright portion to engage over the edge of the bed at the inner side of the cam shaft, a tap spindle slidably journaled on the horizontal portion of the base, a slide vertically operable in the upright portion of the base, gearing from said slide to said tap spindle for imparting reverse rotational movements thereto, a rock lever for imparting longitudinal shifting movements to the tap spindle and cam means on the cam shaft for imparting reciprocatory vertical movements to said slide and oscillatory movements to said rock lever, said spindle having a lead screw extension and a nut block engaged therewith and connected with said lever and whereby said lever actuated by said cam means will impart longitudinal shifting movements to said tap spindle independently of the longitudinal motion imparted thereto by the lead screw and nut.

2. A tapping unit for a machine having a substantially horizontal bed and a cam shaft at the side of the bed and comprising an angular base having a horizontal top portion to seat on the bed and a dependent upright portion to engage over the edge of the bed at the inner side of the cam shaft, a tap spindle slidably journaled on the horizontal portion of the base, a slide vertically operable in the upright portion of the base, gearing from said slide to said tap spindle for imparting reverse rotational movements thereto, a rock lever for imparting longitudinal shifting movements to the tap spindle and cam means on the cam shaft for imparting reciprocatory vertical movements to said slide and oscillatory movements to said rock lever, said spindle having a lead screw extension and a nut block engaged therewith and connected with said lever and whereby said lever actuated by said cam means will impart longitudinal shifting movements to said tap spindle independently of the rotary movements imparted thereto by said slide, and the means for effecting the rotary movements of the tap spindle including a rack on the slide, a pinion operated by said rack, a gear actuated by said pinion and a vertical shaft journaled on the upright portion of the base and having a pinion at the lower end engaged by said gear and a gear at the upper end in driving relation with the spindle.

3. A tapping unit for a machine having a substantially horizontal bed and a cam shaft at the side of the bed and comprising an angular base having a horizontal top portion to seat on the bed and a dependent upright portion to engage over the edge of the bed at the inner side of the cam shaft, a tap spindle slidably journaled on the horizontal portion of the base, a slide vertically operable in the upright portion of the base, gearing from said slide to said tap spindle for imparting reverse rotational movements thereto, a rock lever for imparting longitudinal shifting movements to the tap spindle and cam means on the cam shaft for imparting reciprocatory vertical movements to said slide and oscillatory movements to said rock lever, said spindle having a lead screw extension and a nut block engaged therewith and connected with said lever and whereby said lever actuated by said cam means will impart longitudinal shifting movements to said tap spindle independently of the rotary movements imparted thereto by said slide, and the means for effecting the rotary movements of the tap spindle including a rack on the slide, a pinion operated by said rack, a gear actuated by said pinion and a vertical shaft journaled on the upright portion of the base and having a pinion at the lower end engaged by said gear and a gear at the upper end in driving relation with the spindle, said spindle having a supporting sleeve in which it is slidingly keyed and said sleeve having a gear element in engagement with said gear on the upper end of said upright shaft.

4. A tapping unit for a machine having a substantially horizontal bed and a cam shaft at the side of the bed and comprising an angular base having a horizontal top portion to seat on the bed and a dependent upright portion to engage over the edge of the bed at the inner side of the cam shaft, a tap spindle slidably journaled on the horizontal portion of the base, a slide vertically operable in the upright portion of the base, gearing from said slide to said tap spindle for imparting reverse rotational movements thereto, a rock lever for imparting longitudinal shifting movements to the tap spindle and cam means on the cam shaft for imparting reciprocatory vertical movements to said slide and oscillatory movements to said rock lever, said rock lever being operatively connected with the tap spindle through the medium of a second lever geared to and actuated by said rock lever and a nut block carried by said second lever, the tap spindle having a lead screw extension engaged in said nut block and said nut block being supported to rock in said second lever whereby to maintain alignment on the lead screw extension in the oscillatory movements of said two levers.

5. A tapping unit for a machine having a substantially horizontal bed and a cam shaft at the side of the bed and comprising an angular base having a horizontal top portion to seat on the bed and a dependent upright portion to engage over the edge of the bed at the inner side of the cam shaft, a tap spindle slidably journaled on the horizontal portion of the base, a slide vertically operable in the upright portion of the base, gearing from said slide to said tap spindle for imparting reverse rotational movements thereto, a rock lever for imparting longitudinal shifting movements to the tap spindle and cam means on the cam shaft for imparting reciprocatory vertical movements to said slide and oscillatory movements to said rock lever, said rock lever being operatively connected with the tap spindle through the medium of a second lever geared to and actuated by said rock lever, a nut block carried by said second lever, the tap spindle having a lead screw extension engaged in said nut block and said nut block being supported to rock in said second lever whereby to maintain alignment on the lead screw extension in the oscillatory movements of said two levers, and a spring acting on said second lever and through said geared connection with the rock lever to hold the latter engaged with the cam means for actuating the same.

FREDERICK KOCH.

REFERENCES CITED

The following references are of record in the file of this patent:

UNITED STATES PATENTS

| Number | Name | Date |
|---|---|---|
| 512,542 | Forbes | Jan. 9, 1894 |
| 620,475 | Miner | Feb. 28, 1899 |
| 2,068,084 | Stahlhammer | Jan. 19, 1937 |
| 2,500,540 | Graves | Mar. 14, 1950 |